(12) United States Patent
Abramson et al.

(10) Patent No.: US 11,738,517 B2
(45) Date of Patent: Aug. 29, 2023

(54) MULTI DISPENSE HEAD ALIGNMENT USING IMAGE PROCESSING

(71) Applicant: Applied Materials, Inc., Santa Clara, CA (US)

(72) Inventors: Igor Abramson, San Jose, CA (US); Mo Yang, Sunnyvale, CA (US); Jason G. Fung, Santa Clara, CA (US); Douglas Kitajima, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 108 days.

(21) Appl. No.: 17/343,573

(22) Filed: Jun. 9, 2021

(65) Prior Publication Data

US 2021/0394454 A1 Dec. 23, 2021

Related U.S. Application Data

(60) Provisional application No. 63/040,905, filed on Jun. 18, 2020.

(51) Int. Cl.
| | |
|---|---|
| *B33Y 10/00* | (2015.01) |
| *B33Y 50/02* | (2015.01) |
| *B29C 64/112* | (2017.01) |
| *B29C 64/393* | (2017.01) |
| *G01B 11/27* | (2006.01) |
| *B33Y 30/00* | (2015.01) |
| *B29C 64/264* | (2017.01) |
| *B24D 11/00* | (2006.01) |

(52) U.S. Cl.
CPC .......... *B29C 64/393* (2017.08); *B29C 64/112* (2017.08); *B33Y 10/00* (2014.12); *B33Y 30/00* (2014.12); *B33Y 50/02* (2014.12); *G01B 11/272* (2013.01); *B24D 11/003* (2013.01); *B29C 64/264* (2017.08)

(58) Field of Classification Search
None
See application file for complete search history.

(56) References Cited

U.S. PATENT DOCUMENTS

| | | | |
|---|---|---|---|
| 6,315,383 B1 * | 11/2001 | Sarmast | B41J 2/16579 347/19 |
| 9,669,512 B2 | 6/2017 | Bajaj et al. | |
| 9,776,361 B2 | 10/2017 | Krishnan et al. | |

(Continued)

*Primary Examiner* — Alexander M Weddle
(74) *Attorney, Agent, or Firm* — PATTERSON & SHERIDAN, LLP

(57) ABSTRACT

Embodiments of the present disclosure generally relate to droplet ejecting additive manufacturing systems used in the manufacturing of advanced polishing articles. In particular, embodiments herein provide methods for aligning a plurality of dispense heads of the additive manufacturing system. In one embodiment, a method for aligning a plurality of dispense heads of an additive manufacturing system includes forming an alignment test pattern comprising droplets dispensed from each of the plurality of dispense heads, comparing the placement of one or more of the droplets to determine offset distances therebetween, and generating one or more timing offsets based on the offset distances. In some embodiments, the method further includes using the timing offsets to control the dispensing of droplets from one or more of the plurality of dispense heads in a subsequent additive manufacturing process.

12 Claims, 5 Drawing Sheets

(56) References Cited

U.S. PATENT DOCUMENTS

| | | |
|---|---|---|
| 9,873,180 B2 | 1/2018 | Bajaj et al. |
| 10,322,491 B2 | 6/2019 | Orilall et al. |
| 10,384,330 B2 | 8/2019 | Bajaj et al. |
| 10,391,605 B2 | 8/2019 | Ganapathiappan et al. |
| 10,399,201 B2 | 9/2019 | Ganapathiappan et al. |
| 10,456,886 B2 | 10/2019 | Ganapathiappan et al. |
| 10,493,691 B2 | 12/2019 | Krishnan et al. |
| 10,537,974 B2 | 1/2020 | Bajaj et al. |
| 10,593,574 B2 | 3/2020 | Fung et al. |
| 10,618,141 B2 | 4/2020 | Chockalingam et al. |
| 10,773,509 B2 | 9/2020 | Ng et al. |
| 10,821,573 B2 | 11/2020 | Bajaj et al. |
| 10,875,145 B2 | 12/2020 | Bajaj et al. |
| 10,875,153 B2 | 12/2020 | Bajaj et al. |
| 10,919,123 B2 | 2/2021 | Hariharan et al. |
| 10,953,515 B2 | 3/2021 | Ganapathiappan et al. |
| 2004/0263550 A1* | 12/2004 | Mitsuzawa ............... B41J 3/543 347/12 |
| 2016/0101500 A1 | 4/2016 | Fung et al. |
| 2019/0030678 A1 | 1/2019 | Kumar et al. |
| 2019/0039204 A1 | 2/2019 | Chockalingam et al. |
| 2019/0047112 A1 | 2/2019 | Fu et al. |
| 2019/0202024 A1 | 7/2019 | Ganapathiappan et al. |
| 2019/0224809 A1 | 7/2019 | Ganapathiappan et al. |
| 2019/0299357 A1 | 10/2019 | Orilall et al. |
| 2019/0299537 A1 | 10/2019 | McClintock et al. |
| 2019/0337117 A1 | 11/2019 | Ganapathiappan et al. |
| 2020/0001433 A1 | 1/2020 | Bajaj et al. |
| 2020/0055161 A1 | 2/2020 | Chockalingham et al. |
| 2020/0070302 A1 | 3/2020 | Ganapathiappan et al. |
| 2020/0101657 A1 | 4/2020 | Krishnan et al. |
| 2020/0135517 A1 | 4/2020 | Fung et al. |
| 2020/0147750 A1 | 5/2020 | Bajaj et al. |
| 2020/0230781 A1 | 7/2020 | Chockalingam et al. |
| 2020/0299834 A1 | 9/2020 | Bajaj et al. |
| 2020/0325353 A1 | 10/2020 | Sridhar et al. |
| 2021/0107116 A1 | 4/2021 | Bajaj et al. |

* cited by examiner

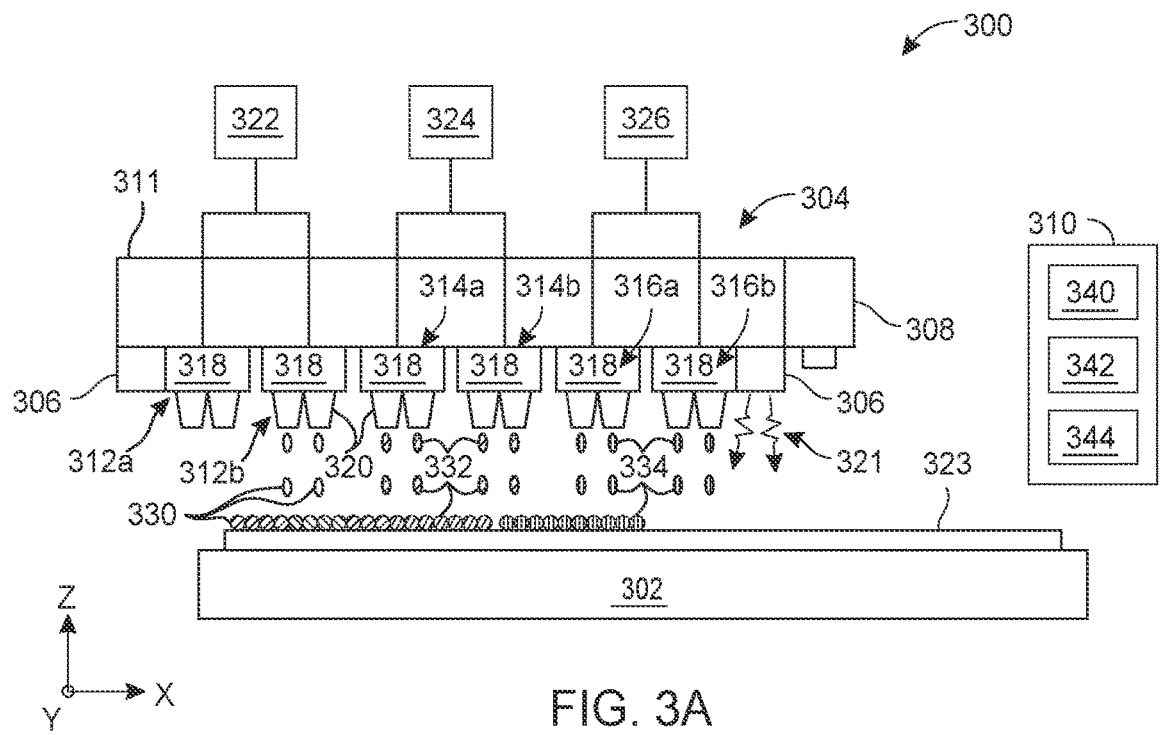
FIG. 3A
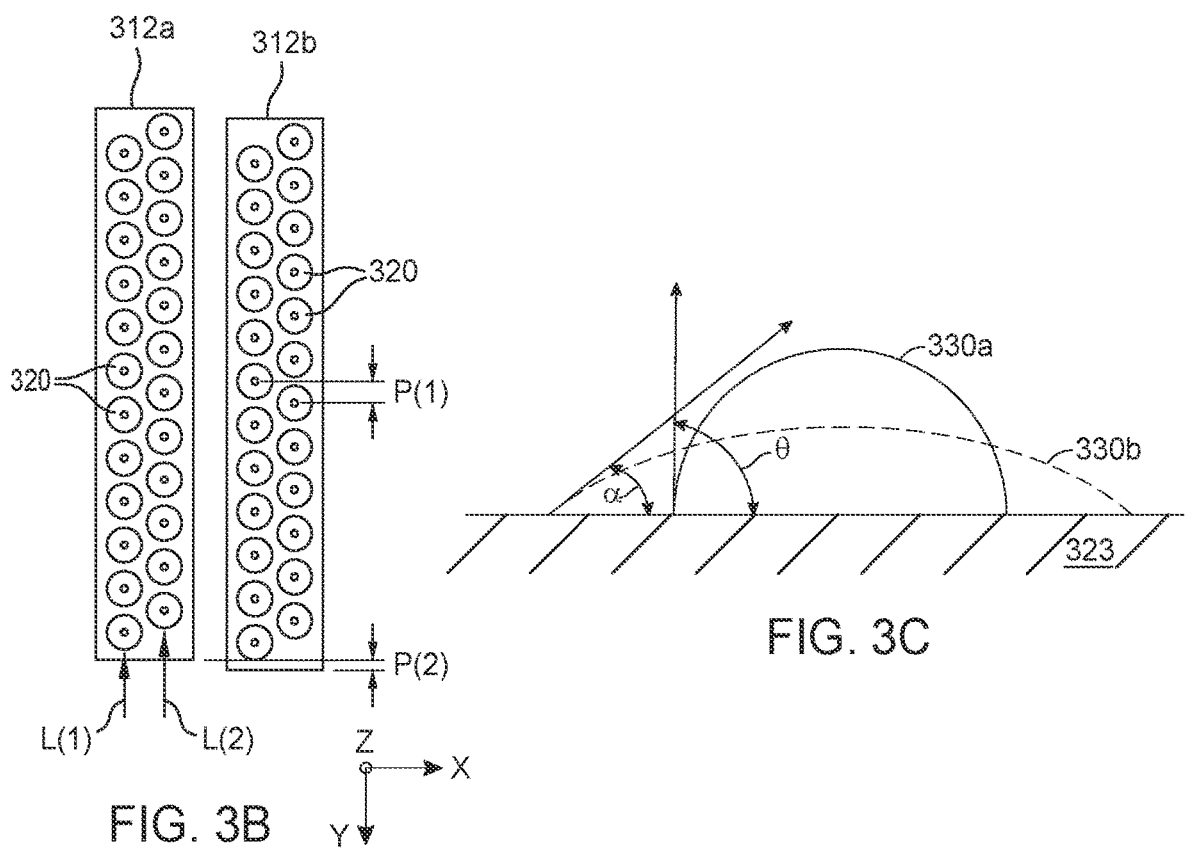
FIG. 3B
FIG. 3C

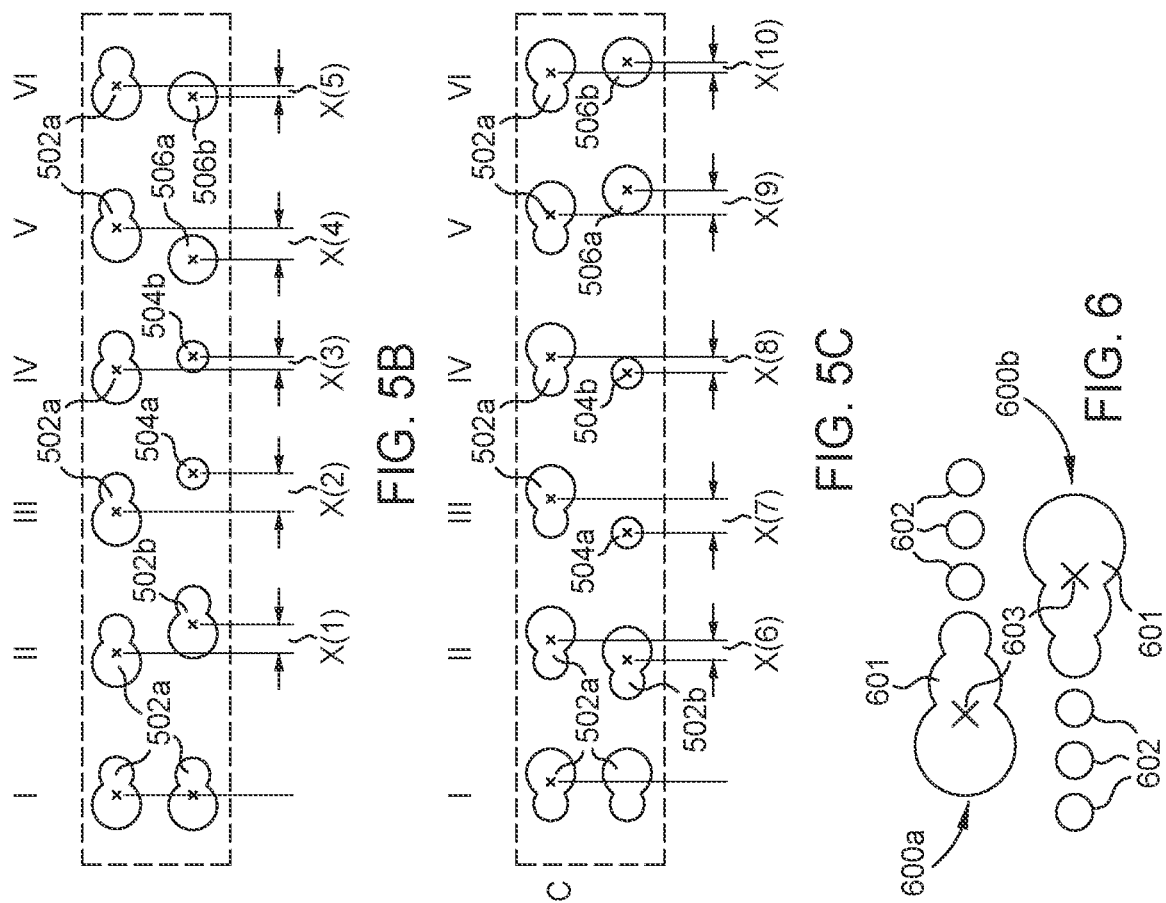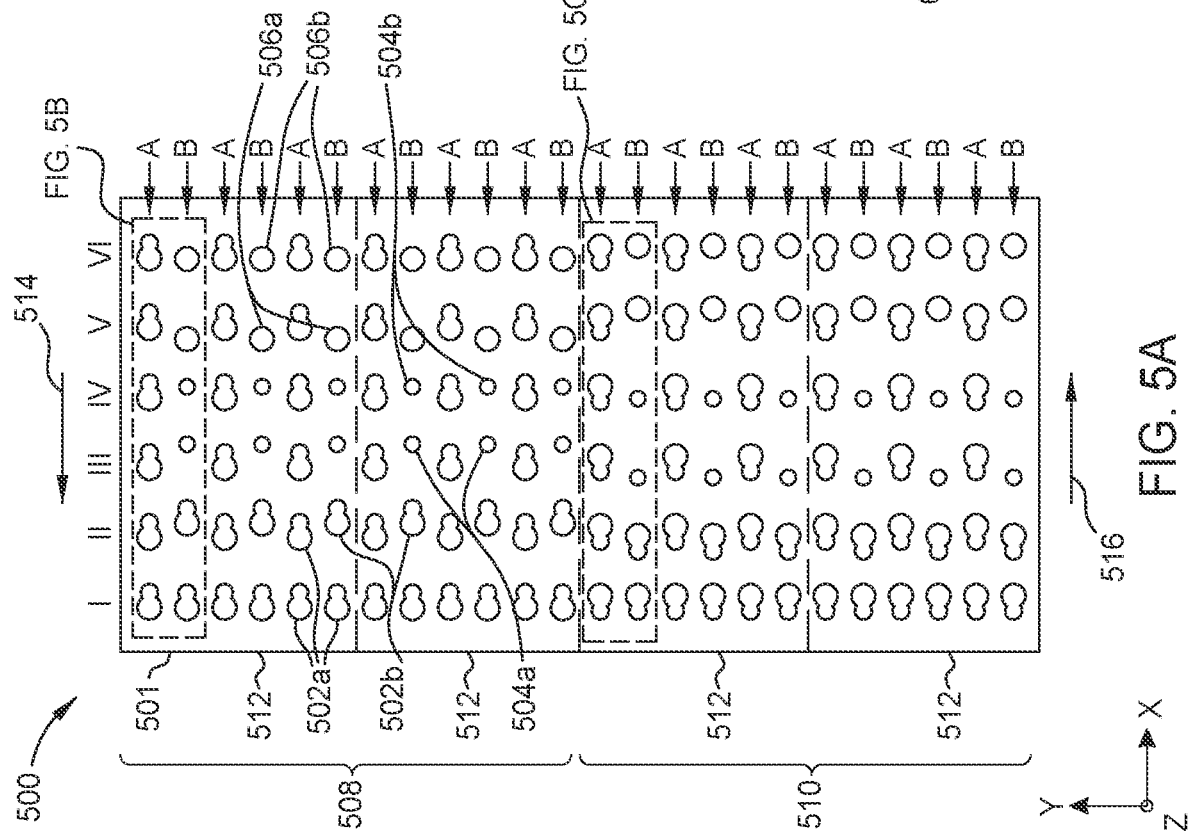

MULTI DISPENSE HEAD ALIGNMENT USING IMAGE PROCESSING

CROSS-REFERENCE TO RELATED APPLICATIONS

This application claims the benefit of U.S. Provisional Application No. 63/040,905, filed on Jun. 18, 2020, which is incorporated by reference herein in its entirety.

BACKGROUND

Field

Embodiments of the present disclosure generally relate to a droplet ejecting additive manufacturing system used in the manufacturing of advanced polishing articles. In particular, embodiments herein provide methods for aligning a plurality of dispense heads an additive manufacturing system used in the manufacturing of advanced chemical mechanical polishing (CMP) pads.

Description of the Related Art

Chemical mechanical polishing (CMP) is commonly used in the manufacturing of high-density integrated circuits to planarize or polish a layer of material deposited on a substrate. A typical CMP process includes contacting the material layer to be planarized with a polishing pad and moving both the polishing pad and the substrate, and hence providing relative movement between the material layer surface and the polishing pad, in the presence of a polishing fluid comprising abrasive particles. One common application of CMP in semiconductor device manufacturing is planarization of a bulk film, for example, pre-metal dielectric (PMD) or interlayer dielectric (ILD) polishing, where underlying two or three-dimensional features create recesses and protrusions in the surface of the layer to be planarized. Other common applications of CMP in semiconductor device manufacturing include shallow trench isolation (STI) and interlayer metal interconnect formation, where CMP is used to remove the via, contact, or trench fill material from the exposed surface (field) of the layer having the STI or metal interconnect features disposed therein.

Typically, the selection of a polishing pad is based on the polishing performance characteristics of the polishing pad and the desirability of those performance characteristics for a specific CMP application. Some examples of polishing pad properties that may influence the performance characteristics thereof include hardness, mechanical strength, and fluid transportability. Such properties may be determined by a variety of factors, including the material properties of polymers used to form various features of the polishing pad, the shape, size, and positioning of the features formed of those polymers, and factors influencing porosity and pore distribution within those features.

In recent years additive manufacturing systems using droplet ejecting dispense heads have emerged as a promising technology for providing highly tuned polishing pads with desired performance characteristics. These systems enable controlled placement of different pre-polymer compositions, additive compositions, and/or pore-forming compositions within a polishing feature, as well as increased control as to the sizes, shapes, and positioning of the features themselves. Typically, each of the different compositions are dispensed in droplets using one or more droplet ejecting dispense heads corresponding thereto. Unfortunately, variability in the additive manufacturing process can cause differences between the actual placement of dispensed droplets and the desired placement of the droplets, thus affecting the quality and repeatability of polishing pads formed therefrom.

Accordingly, there is a need in the art for methods of calibrating a droplet ejecting additive manufacturing process that solves the problems described above.

SUMMARY

Embodiments of the present disclosure generally relate to droplet ejecting additive manufacturing systems used in the manufacturing of advanced polishing articles. In particular, embodiments herein provide methods for aligning a plurality of dispense heads of the additive manufacturing system.

In one embodiment, a method for aligning a plurality of dispense heads of an additive manufacturing system is provided. Generally, the method includes forming an alignment test pattern comprising droplets dispensed from each of the plurality of dispense heads, comparing the placement of one or more of the droplets to determine offset distances therebetween, and generating one or more timing offsets based on the offset distances. In some embodiments, the method further includes using the timing offsets to control the dispensing of droplets from one or more of the plurality of dispense heads in a subsequent additive manufacturing process. In some embodiments, the alignment test pattern comprises a plurality of spaced-apart droplets arranged in a grid pattern on a test substrate. The plurality of spaced-apart droplets includes first droplets dispensed from a first dispense head and second droplets dispensed from one or more second dispense heads. Here, the grid pattern comprises one or more columns corresponding to each of the one or more second dispense heads, where each of the one or more columns comprises first droplets and second droplets dispensed from the corresponding one of the one or more second dispense heads. In some embodiments, comparing the placement of one or more of the droplets to determine offset distances therebetween includes comparing, within each of the one or more columns, a placement of the second droplets to a placement of the first droplets to determine an offset distance therebetween.

In another embodiment, an additive manufacturing system is provided. The additive manufacturing system includes a manufacturing support and a dispense head assembly. The dispense head assembly includes a plurality of dispense heads disposed above the manufacturing support and facing there towards. The plurality of dispense heads includes a first dispense head and one or more second dispense heads. The additive manufacturing system further includes a non-transitory computer readable medium having instructions stored thereon for performing a method of aligning the plurality of dispense heads with one another. Generally, the method includes forming an alignment test pattern comprising droplets dispensed from each of the plurality of dispense heads, comparing the placement of one or more of the droplets to determine offset distances therebetween, and generating one or more timing offsets based on the offset distances. In some embodiments, the method further includes using the timing offsets to control the dispensing of droplets from one or more of the plurality of dispense heads in a subsequent additive manufacturing process. In some embodiments, the alignment test pattern comprises a plurality of spaced-apart droplets arranged in a grid pattern on a test substrate. The plurality of spaced-apart droplets includes first droplets dispensed from the first dispense head and second droplets dispensed from the one or more second dispense heads. Here, the grid pattern comprises one or more columns corresponding to each of the one or more second dispense heads where each of the one or more columns comprises first droplets and second droplets dispensed from the corresponding one of the one or more second dispense heads. In some embodiments, comparing the placement of one or more of the droplets to determine offset distances therebetween includes comparing, within each of the one or more columns, a placement of the second droplets to a placement of the first droplets to determine an offset distance therebetween.

In another embodiment, a method for aligning a plurality of dispense heads of an additive manufacturing system is provided. The method includes forming an alignment test pattern comprising a plurality of spaced-apart droplets arranged in a grid. The grid includes one or more columns, where each of the one or more columns includes first droplets dispensed from a first dispense head and second droplets dispensed from a corresponding one of one or more second dispense heads. The method further includes comparing, within each of the one or more columns, a placement of the second droplets to a placement of the first droplets to determine an offset distance therebetween. The method further includes generating, using the offset distances determined within each of the one or more columns, one or more timing offsets to be used for corresponding ones of each of the one or more second dispense heads.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3A is a schematic side view of an exemplary additive manufacturing system, according to one embodiment, which may benefit from the dispense head alignment methods set forth in FIG. 4.

FIG. 3B is a schematic bottom-up view of a plurality of dispense heads of the additive manufacturing system of FIG. 3A, according to one embodiment.

FIG. 3C is a schematic view side view illustrating a droplet dispensed using the additive manufacturing system of FIG. 3A, according to one embodiment.

FIGS. 5A-5C are schematic top-down views of an alignment test pattern, according to one embodiment, that may be used with the method set forth in FIG. 4.

FIG. 6 is a schematic top-down view of droplets dispensed using the additive manufacturing system of FIG. 3A according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to droplet ejecting additive manufacturing systems used in the manufacturing of advanced polishing articles. In particular, embodiments herein provide methods for aligning a plurality of dispense heads of the additive manufacturing systems.

Generally, the additive manufacturing systems described herein are configured to form (print) at least portions of a polishing pad in a layer-by-layer additive manufacturing process. Each print layer is formed (printed) by sequentially dispensing and at least partially curing droplets of one or more pre-polymer compositions onto a manufacturing support of the additive manufacturing system or onto a previously formed print layer disposed on the manufacturing support. The droplets are dispensed using a dispense head which features a reservoir for holding a pre-polymer composition and a plurality of droplet ejecting nozzles in fluid communication with the reservoir. Each of the droplet ejecting nozzles of a dispense head may be independently controlled from one another such that droplets are independently ejected ("fired") to form a desired pattern of the droplets on the manufacturing support or on the previously formed print layer disposed thereon.

In some embodiments, the additive manufacturing system is configured to form print layers comprising at least two different compositions, such as a pre-polymer composition and a pore-forming composition, at least two different pre-polymer compositions, or a combination thereof. In those embodiments, the additive manufacturing system typically features a plurality of dispense heads coupled to one another in a fixed arrangement to form a dispense head assembly. Each of the dispense heads of the dispense head assembly is configured to eject droplets of a pre-polymer composition or pore-forming composition respectively disposed in the reservoirs thereof.

Unfortunately, variations between additive manufacturing systems, variations in additive manufacturing processes, and variations in droplet composition can individually or collectively cause misalignment between the actual placement of droplets and the desired placement of droplets during the additive manufacturing process. Therefore, methods provided herein beneficially enable the controlled and repeatable calibration and/or alignment of droplet placement in a multi-dispense head additive manufacturing system, e.g., a 2D or 3D polyjet printer.

Figure 1:
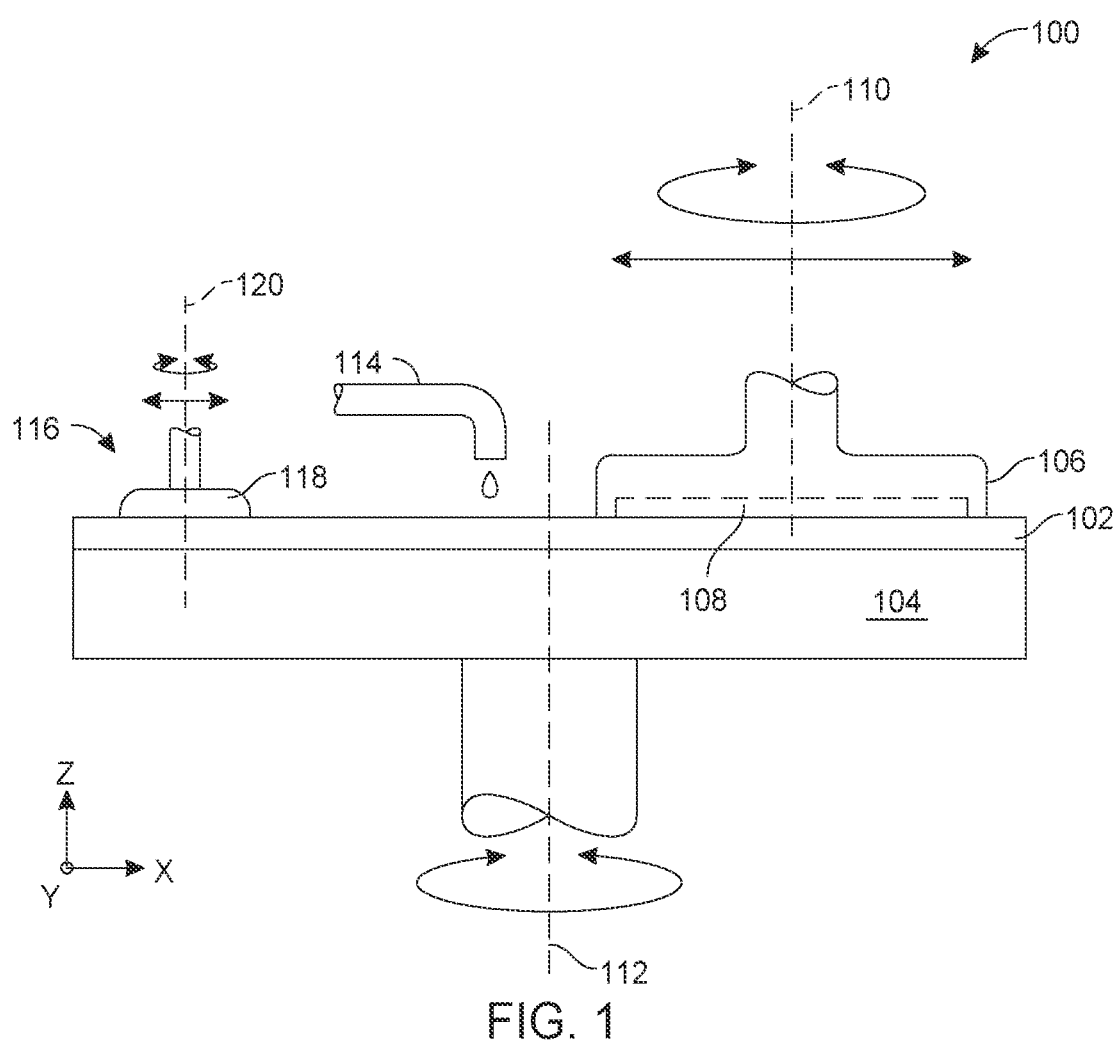
FIG. 1 is a schematic side view of an exemplary polishing system configured to use a polishing pad formed using an additive manufacturing system.

FIG. 1 is a schematic side view of an exemplary polishing system configured to use a polishing pad formed according to one or a combination of embodiments described herein. Here, the polishing system 100 features a platen 104, having a polishing pad 102 secured thereto using a pressure-sensitive adhesive (PSA) and a substrate carrier 106. The substrate carrier 106 faces the platen 104 and the polishing pad 102 mounted thereon. The substrate carrier 106 is used to urge a material surface of a substrate 108, disposed therein, against the polishing surface of the polishing pad 102 while simultaneously rotating about a carrier axis 110. Typically, the platen 104 rotates about a platen axis 112 while the rotating substrate carrier 106 sweeps back and forth from an inner diameter to an outer diameter of the platen 104 to, in part, reduce uneven wear of the polishing pad 102.

The polishing system 100 further includes a fluid delivery arm 114 and a pad conditioner assembly 116. The fluid delivery arm 114 is positioned over the polishing pad 102 and is used to deliver a polishing fluid, such as a polishing slurry having abrasives suspended therein, to a surface of the polishing pad 102. Typically, the polishing fluid contains a pH adjuster and other chemically active components, such as an oxidizing agent, to enable chemical mechanical polishing of the material surface of the substrate 108. The pad conditioner assembly 116 is used to condition the polishing pad 102 by urging a fixed abrasive conditioning disk 118 against the surface of the polishing pad 102 before, after, or during polishing of the substrate 108. Urging the conditioning disk 118 against the polishing pad 102 includes rotating the conditioning disk 118 about an axis 120 and sweeping the conditioning disk 118 from an inner diameter of the platen 104 to an outer diameter of the platen 104. The conditioning disk 118 is used to abrade, rejuvenate, and remove polish byproducts or other debris from the polishing surface of the polishing pad 102.

Figure 2:
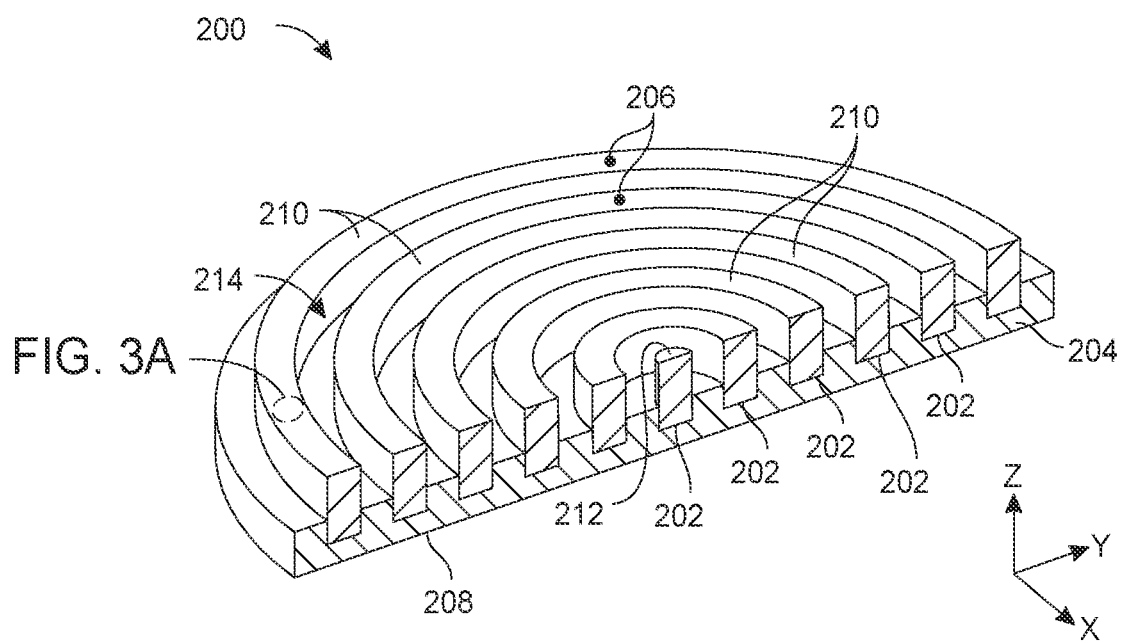
FIG. 2 is a schematic perspective sectional view of an exemplary polishing pad formed using an additive manufacturing system, such as the additive manufacturing system set forth in FIG. 3A.

FIG. 2 is a schematic perspective sectional view of an exemplary polishing pad 200 formed using an additive manufacturing system, such as the additive manufacturing system 300 set forth in FIG. 3A. The polishing pad 200 may be used in place of the polishing pad 102 of FIG. 1. Here, the polishing pad 200 features a plurality of polishing elements 202, which are partially disposed within a base element 204 and extend upwardly from a surface of the base element 204 to form a polishing surface 206. The polishing elements 202 are supported in the thickness direction of the pad 200, here the Z-direction, by portions of the base element 204 disposed between the polishing elements 202 and a mounting surface 208 of the polishing pad 200. The mounting surface 208 is opposite of the polishing surface 206 and is typically secured a polishing platen using a layer of pressure-sensitive adhesive (not shown). Here, the polishing elements 202 comprise a plurality of concentric rings 210 and a post 212. The plurality of concentric rings 210 are disposed about the post 212 and extend radially outward therefrom.

Typically, the plurality of polishing elements 202 and the base element 204 define a plurality of channels 214 disposed in the polishing pad 200 between each of the polishing elements 202 and between a plane of the polishing surface of the polishing pad 200 and a surface of the base element 204. The channels 214 facilitate the distribution of polishing fluids across the polishing pad 200 and to an interface between the polishing pad 200 and a material surface of a substrate to be polished thereon.

The additive manufacturing system described herein enables the formation of polishing elements 202 comprising any other desired shape, such as individual polishing elements having a top-down sectional shape that is circular, rectangular, spiral, fractal, random, another pattern, or combinations thereof. In some embodiments, the shapes and widths of the polishing elements 202, and the distances therebetween, are varied across the polishing pad 200 to tune hardness, mechanical strength, fluid transport characteristics, or other desirable properties of the complete polishing pad 200.

Figure 4:
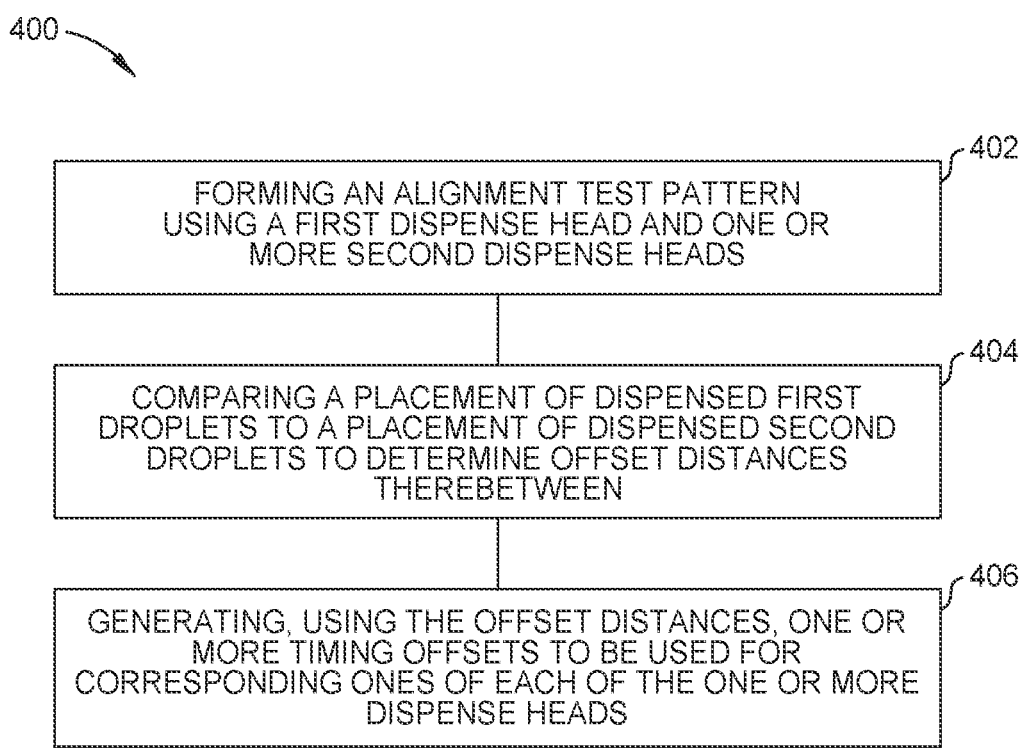
FIG. 4 is a diagram setting forth a method of aligning a plurality of dispense heads of the additive manufacturing system of FIG. 3A, according to one embodiment.

FIG. 3A is a schematic side view of an exemplary additive manufacturing system 300, according to one embodiment, which may benefit from the dispense head alignment methods set forth in FIG. 4. FIG. 3B is a schematic bottom-up view of a portion of the dispense head assembly 304 shown in FIG. 3A, according to one embodiment.

Here, the additive manufacturing system 300 features a manufacturing support 302, a dispense head assembly 304 disposed above the manufacturing support 302 and facing theretoward, one or more curing energy sources 306, an image sensor 308, e.g., a camera, and a system controller 310. In some embodiments, the curing energy sources 306 and the image sensor 308 are coupled to the dispense head assembly 304 and are thus movable therewith.

As shown, the dispense head assembly 304 includes a support member 311 and plurality of dispense heads 312a-b, 314a-b, and 316a-b individually coupled to the support member 311. Each of the dispense heads 312a-b, 314a-b, 316a-b features a fluid reservoir 318 and a plurality of droplet ejecting nozzles 320 where each of the nozzles 320 is in fluid communication with the fluid reservoir 318. Here, each of the fluid reservoirs 318 are fluidly coupled to a precursor source, such as pre-polymer composition sources 322 and 324 or a pore-forming composition source 326, which delivers the respective precursors thereinto. Thus, in this embodiment, dispense heads 312a-b are configured to dispense droplets 330 of a first pre-polymer composition, dispense heads 314a-b are configured to dispense droplets 332 of a second pre-polymer composition and dispense heads 316a-b are configured to dispense droplets 334 of a pore-forming composition.

In some embodiments, one or both of the pre-polymer compositions comprise a mixture of one or more of functional polymers, functional oligomers, functional monomers, reactive diluents, and photoinitiators. In some embodiments, the pore-forming composition comprises a sacrificial material, e.g., a glycol, glycol-ether, and/or amine. In some embodiments, the pore-forming composition comprises a sacrificial material precursor, such as a water-soluble polymer precursor. Typically, the sacrificial material or the water-soluble polymer will dissolve in the presence of a polishing fluid to form desired pores in the polymer material of the polishing pad.

Herein, each of the individual dispense heads 312a-b, 314a-b, and 316a-b comprises a plurality of nozzles 320 disposed in an array that determines the print resolution that may be provided by the individual dispense head. For example, as shown in FIG. 3B, each of the dispense heads 312a-b comprises a plurality of nozzles 320 arranged in two lines L(1) and L(2), where L(1) and L(2) are orthogonal to an X-axis of the manufacturing system 300 and are thus orthogonal to the direction of the relative motions that provide the forward passes and reverse passes described below. The nozzles 320 in each of the lines L(1) and L(2) are offset from the nozzles 320 in the other line L(1) or L(2) within a dispense head by a first-pitch P(1) measured along the Y-axis.

Typically, the first pitch P(1) determines the print resolution, e.g., dots per inch (dpi), that may be provided by an individual dispense head, e.g., dispense head 312a by selectively firing the nozzles 320 thereof as the dispense head 312a moves relative to the manufacturing support 302 along the X-axis. In some embodiments, the nozzles 320 of each of the individual dispense heads 312a-b, 314a-b, and 316a-b are arranged to provide a dispense head print resolution in the range from about 50 to about 250 dpi, such as from about 100 dpi to about 200 dpi, for example about 125 dpi to about 175 dpi.

When a plurality of dispense heads are used to dispense droplets of the same composition, such as the two dispense heads 312a-b shown in FIG. 3B, each of the plurality of dispense heads 312a-b may be offset from one another in the Y-direction to further increase the print resolution of the corresponding composition. For example, here, the dispense head 312a is offset from the dispense head 312b by a second pitch P(2) which is ½ of the first pitch P(1), thus doubling the print resolution for the first precursor composition that would otherwise be provided by a single dispense head 312a. In other embodiments, each to-be-dispensed composition may have a single corresponding dispense head, three or more corresponding dispense heads, or for example, four or more corresponding dispense heads. The number of dispense heads corresponding to each of the compositions may be the same or different as the number of dispense heads corresponding to each of the other compositions. In one example, four dispense heads, each having a print resolution of 150 dpi, are used to dispense an individual composition, each of the four dispense heads are offset from another of the four dispense heads by ¼ of the pitch P(1) to provide a combined print resolution of 600 dpi. Herein the print resolution is measured in a direction orthogonal to the forward and reverse passes as described below with respect to the operation of the additive manufacturing system 300.

During a typical additive manufacturing process, one or both of the manufacturing support 302 and the dispense head assembly 304 moves along the X-axis to provide a relative motion therebetween in one of a first pass or a second pass that is opposite the first pass. As one or both of the manufacturing support 302 and the dispense head assembly 304 are moved relative to one another during either the first or second pass, droplets are concurrently dispensed from the respective dispense heads 312a-b, 314a-b, and 316a-b towards the manufacturing support 302 disposed there below. Between alternating first passes and second passes, the manufacturing support 302 is indexed along the Y-axis to place the manufacturing support 302 and dispense head assembly 304 in a beginning position for the next pass. Repetitions of the first pass, the second pass, and indexing along the Y-axis therebetween may be continued until a desired print layer is formed on the manufacturing support 302 or on a previously formed print layer disposed on the manufacturing support 302.

In some embodiments, the dispensed droplets 330, 332, and/or 334 are exposed to electromagnetic radiation 321 from the curing energy source 306 to physically fix the droplet before it spreads to an equilibrium size such as set forth in the description of FIG. 3C. Typically, the dispensed droplets 330, 332, and/or 334 are exposed to electromagnetic radiation 321 to at least partially cure the pre-polymer compositions thereof within 1 second or less of the droplet contacting a surface, such as the surface of the manufacturing support 302 or of a previously formed print layer 323 disposed on the manufacturing support 302.

FIG. 3C is a close up cross-sectional view schematically illustrating a droplet 330a disposed on a surface of a previously formed layer, such as the previously formed layer 323 described in FIG. 3A, according to some embodiments. In a typically additive manufacturing process, a droplet of pre-polymer composition, such as the droplet 330a will spread and reach an equilibrium contact angle α with the surface of a previously formed layer 323 within about one second from the moment in time that the droplet 330a contacts the surface of the previously formed layer 323. The equilibrium contact angle α is a function of at least the material properties of the pre-polymer composition and the energy at the surface (surface energy) of the previously formed layer, e.g., previously formed layer 323. In some embodiments, it is desirable to at least the partially cure the dispensed droplet before it reaches an equilibrium size in order to fix the droplets contact angle with the surface of the previously formed layer 323. In those embodiments, the fixed droplet's 330a contact angle θ is greater than the equilibrium contact angle α of the droplet 330b of the same pre-polymer composition, which was allowed to spread to its equilibrium size.

Herein, the operation of the additive manufacturing system 300 is directed by the system controller 310. The system controller 310 includes a programmable central processing unit (CPU 340) which is operable with a memory 342 (e.g., non-volatile memory) and support circuits 344. The support circuits 344 are conventionally coupled to the CPU 340 and comprise cache, clock circuits, input/output subsystems, power supplies, and the like, and combinations thereof coupled to the various components of the additive manufacturing system 300, to facilitate control thereof. The CPU 340 is one of any form of general purpose computer processor used in an industrial setting, such as a programmable logic controller (PLC), for controlling various components and sub-processors of the additive manufacturing system 300. The memory 342, coupled to the CPU 340, is non-transitory and is typically one or more of readily available memories such as random access memory (RAM), read only memory (ROM), floppy disk drive, hard disk, or any other form of digital storage, local or remote. Generally, the memory 342 is in the form of a computer-readable storage media containing instructions (e.g., non-volatile memory), which when executed by the CPU 340, facilitates the operation of the manufacturing system 300.

In some embodiments, the instructions in the memory 342 are in the form of a program product such as a program that implements the methods of the present disclosure. The program code may conform to any one of a number of different programming languages. In one example, the disclosure may be implemented as a program product stored on computer-readable storage media for use with a computer system. The program(s) of the program product define functions of the embodiments (including the methods described herein). Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure. In some embodiments, the methods set forth herein, or portions thereof, are performed by one or more application specific integrated circuits (ASICs), field-programmable gate arrays (FPGAs), or other types of hardware implementations. In some other embodiments, the methods set forth herein are performed by a combination of software routines, ASIC(s), FPGAs and, or, other types of hardware implementations.

Here, the system controller 310 directs the motion of the manufacturing support 302, the motion of the dispense head assembly 304, the firing of the nozzles 320 to eject droplets of precursor compositions therefrom, and the degree and timing of the curing of the dispensed droplets 330, 332, and/or 334 provided by the curing energy source 306. In some embodiments, the system controller 310 directs the operation of the image sensor 308. In some embodiments, the instructions used by the system controller to direct the operation of the additive manufacturing system 300 include droplet dispense patterns for each of the print layers to be formed. In some embodiments, the droplet dispense patterns are collectively stored in the memory 342 as CAD-compatible digital printing instructions. In one embodiment, the printing instructions comprise the droplet alignment test pattern, which may be used to perform the dispense head alignment methods set forth in FIG. 4.

FIG. 4 is a diagram setting forth a method 400 of aligning the dispense heads of the additive manufacturing system 300, according to one embodiment. "Aligning the dispense heads" herein generally includes adjusting the timing of firing commands which control the droplet dispensing nozzles 320 of the dispense heads 312a-b, 314a-b, and 316a-b. FIGS. 5A-5C schematically illustrate various aspects of the method 400 set forth below. FIG. 5A is a top down view of a portion of an alignment test pattern 500 formed on a test substrate. FIGS. 5B and 5C are close up views of portions of the alignment test pattern 500.

Typically, the firing commands to the nozzles 320 of the dispense heads 312a-b, 314a-b, and 316a-b are timed to place droplets dispensed therefrom in a desired location on a surface of the test substrate 501 as the test substrate 501 and the dispense heads 312a-b, 314a-b, and 316a-b move relative to one another along the X-axis. To align the plurality of dispense heads 312a-b, 314a-b, and 316a-b with one another, the timing of the firing commands for the dispense heads are adjusted using timing offsets. The timing offsets are determined by comparing the actual placement locations of droplets on the test substrate 501 to the desired placement locations of droplets on the test substrate 501. The desired placement locations of droplets are determined using droplets dispensed from one of the plurality of dispense heads, e.g., dispense head 312a, as reference points as further described in the activities of the method 400 below.

At activity 402, the method 400 includes forming an alignment test pattern 500 using a plurality of dispense heads of an additive manufacturing system. Here, the plurality of dispense heads include a first dispense head 312a, and one or more second dispense heads 312b, 314a-b, and 316a-b. Although dispense head 312a is used as the first dispense head herein, it is contemplated that any one of the dispense heads 312a-b, 314a-b, and 316a-b may be used as the first dispense head in performing the various activities described below.

Forming the alignment test pattern 500 includes dispensing droplets from each of the dispense heads 312a-b, 314a-b, and 316a-b onto a surface of the test substrate 501, e.g., a rectangular sheet of glass, which is disposed on the manufacturing support 302. Typically, the droplets are dispensed according to alignment print instructions stored in the memory of the system controller, which are executable by the CPU as a system alignment recipe. In FIG. 5A, a first plurality of the droplets, e.g., the droplets 502a-b, 504a-b, and 506a-b, which are labeled in FIGS. 5B and 5C, are dispensed onto the test substrate 501 in a first pass 508, the test substrate is indexed in the Y-direction, and a second plurality of the droplets 502a-b, 504a-b, and 506a-b are dispensed in a second pass 510. Droplets dispensed in the first pass 508 and the second pass 510 collectively form the alignment test pattern 500.

Here, the alignment test pattern 500 comprises a grid of spaced apart droplets arranged in a plurality of first rows A, a plurality of second rows B, and a plurality of columns I-VI. The plurality of first rows A includes first droplets 502a, dispensed from dispense head 312a, which serve as reference droplets for the alignment method 400. The plurality of second rows B comprise second droplets 502b, 504a-b, and 506a-b respectively dispensed from the remaining to-be-aligned plurality of dispense heads, e.g., 312b, 314a-b, and 316a-b. Within each of the second rows B, the first and second droplets 502a-b, 504a-b, and 506a-b are positioned within a respective column of the plurality of columns I-VI. Here, the first column I comprises only the first droplets 502a. In some embodiments, the first column I may be omitted from the alignment test pattern 500. Each of the remaining columns II-VI comprises the first droplets 502a disposed in the first rows A and the second droplets 502b, 504a-b, and 506a-b disposed in the second rows B.

In some embodiments, forming the alignment test pattern 500 further comprises exposing the dispensed first and/or second droplets 502a-b, 504a-b, and 506a-b to electromagnetic radiation, e.g., UV radiation, to at least partially cure the dispensed droplets. In some embodiments, the dispensed first and/or second droplets 502a-b, 504a-b, and 506a-b are at least partially cured to fix the size thereof before the droplets spread to their equilibrium size. In some embodiments, the dispensed first and/or second droplets 502a-b, 504a-b, and 506a-b are exposed to UV radiation within one second or less of contacting the surface of the test substrate 501.

At activity 404, the method 400 includes comparing the placement of the second droplets 502b, 504a-b, and 506a-b in the second rows B to the placement of the first droplets 502a to determine respective offset distances therebetween. Here, the respective locations between the first droplets 502a and the second droplets 502b, 504a-b, 506a-b are compared within each of the columns II-IV and are separately determined for the first pass 508 and the second pass 510, as shown in FIGS. 5B and 5C. In some embodiments, the offset distances X(1)-X(10) are measured along the X-axis as a distance between parallel lines disposed through each of the respective droplets.

Here, the offset distances X(1)-X(10) are determined using the centroids of the respective droplets, i.e., between the geometric centers of the respective droplets when viewed from the top down. Using the centroids of the respective droplets to measure the offset distances X(1)-X(10) facilitates repeatable alignment between droplets of different shapes and sizes. The shapes and sizes of the dispensed droplets 502a-b, 504a-b, and/or 506a-b may be influenced by a variety of factors, such as droplet volume, composition, viscosity, temperature, and/or the relative motion between the manufacturing support 302 and the head assembly 304 as the droplets make contact with the surface of the test substrate 501. As shown, each of the offset distances X(1)-X(10) are determined by comparing the relative positions of the second droplets 502b, 504a-b, and/or 506a-b in a second row B with positions of the first droplets 502a in a first row A which is adjacent thereto. In some embodiments, a plurality of offset distances within a column, e.g., a plurality of offset distances X(1) for column II, are averaged to provide average offset distances for each of the respective columns II-VI in either or both of the first and second passes 508, 510.

In some embodiments, the droplets may comprise a generally non-symmetrical elongated shape, such as the shape of droplets 502a-b. The elongated shape may be formed by the relative motion between the test substrate 501 and the dispensed droplet as the droplet makes contact with the surface of the test substrate 501. The symmetry of the shape, e.g., whether the larger volume of the droplet is disposed to a first side or a second side of a center of the droplet (as measured along the X-axis), is generally indicative of the direction of the relative motion of the test substrate 501 to the droplet as the droplet makes contact with the surface of the test substrate. For example, in FIG. 5B, the larger portions of the droplets 502a-b face towards a first direction of travel 514 of the test substrate 501 in the first pass 508, and the smaller portion of the droplets 502a-b face away from the direction of travel 514. In the second pass 510, the relative direction of travel 516 of the test substrate 501 is opposite of the first direction of travel 514. Thus, the shape of the droplets 502a-b dispensed during the second pass 510 generally mirror (about the X-axis) the shape of the droplets 502a-b formed during the first pass 508. In some embodiments, determining the offset distances X(1)-X(10) includes determining the centroids of the first and/or second droplets. In some embodiments, the determining the centroids of the first and/or second droplets may comprise analyzing images of the alignment test pattern 500 using a readily available numerical computing software application, such as MATLAB® from MathWorks®.

In some embodiments and as shown in FIG. 6, the relative motion between the test substrate 501 and droplets 600a and 600b making contact with the surface thereof may cause a dispensed droplet 600a-b to break into several smaller fluid masses 601, 602. These smaller fluid masses form trailing droplets, here secondary droplets 602, on the surface of the test substrate 501, which may undesirably affect the alignment method, e.g., by skewing the calculation of the centroids 603 of the droplets 600a and 600b. In some embodiments, one or more of the secondary droplets 602 are filtered from data used to determine the centroids 603 in order to avoid undesirable skewing thereof.

In some embodiments, the method 400 further includes acquiring an image of the alignment test pattern 500 formed on the test substrate 501. In those embodiments, the method 400 may further include comparing the placement of the dispensed second droplets 502b, 504a-b, and 506a-b in the second rows B to the placement of the first droplets 502a using the image of the alignment dispense pattern 500. In some embodiments, the image may be acquired using the image sensor 308 coupled to the head assembly 304. In other embodiments, the image may be acquired using a separate image sensor, e.g., a stand-alone camera. In some embodiments, the image may be formed of a plurality of frames 512 individually acquired by an image sensor.

In some embodiments, determining the offset distances X(1)-X(10) between the first droplets 504a and the second droplets 504a, 506a-b, and 508a-b may include converting pixels in the acquired image to a distance unit, such as microns, using a pixel to distance conversion factor. The conversion factor may be separately determined for each acquired image using a known mechanical pitch P(3) (FIG. 5B) between the selectively fired nozzles 320 that are used to dispense the first droplets 502a along the Y-axis. Here, the known mechanical pitch P(3) corresponds to a distance between the centroids of the first droplets 502a in the first column I, and a pixel-to-distance conversion factor for an individual image may be determined therefrom.

At activity 406, the method 400 includes generating, using the offset distances determined within each of the columns, one or more timing offsets to be used for corresponding ones of each of the one or more second dispense heads 312a, 314a-b, and 316a-b. In some embodiments, generating the one or more timing offsets comprises using a software algorithm stored in the memory 342 of the system controller 310. In some embodiments, the software algorithm is executable using a second processor, which is remote from the system controller 310. In some embodiments, the algorithm is executed using a readily available numerical computing software application, such as MATLAB® from MathWorks®.

In some embodiments, activities 402, 404, and/or 406 of the method 400 are repeated until one or more or each of the offset distances X(1)-X(10) are within a desired tolerance, such as within 1 mm or less, 0.5 mm or less, 0.1 mm or less, 0.09 mm or less, 0.08 mm or less, 0.07 mm or less, 0.06 mm or less, 0.05 mm or less, 0.04 mm or less, 0.03 mm or less, 0.02 mm or less, or even 0.01 mm or less.

In some embodiments, the method 400 further includes using the timing offsets to control the dispensing of droplets from one or more of the plurality of dispense heads 312a-b, 314a-b, and 316a-b in an additive manufacturing process.

Beneficially, the methods provided herein enable the controlled and repeatable calibration of droplet placement in a multi-dispense head additive manufacturing system, such as a 2D or 3D polyjet printer.

While the foregoing is directed to embodiments of the present disclosure, other and further embodiments of the disclosure may be devised without departing from the basic scope thereof, and the scope thereof is determined by the claims that follow.

The invention claimed is:

1. A method for an additive manufacturing system, comprising:
    forming an alignment test pattern using a plurality of dispense heads fixedly coupled to a dispense head assembly, wherein the plurality of dispense heads comprise a first dispense head and one or more second dispense heads, and wherein the alignment test pattern comprises:
        a plurality of spaced-apart droplets arranged in a grid pattern on a test substrate, the grid pattern comprising a plurality of first rows, a plurality of second rows, and one or more columns corresponding to each of the one or more second dispense heads, wherein
        each of the one or more columns comprises first droplets dispensed from the first dispense head and second droplets dispensed from a corresponding one of the one or more second dispense heads; and
    comparing, within each of the one or more columns, a placement of the second droplets to a placement of the first droplets to determine respective offset distances therebetween; and
    generating, using the offset distances determined within each of the one or more columns, one or more timing offsets to be used for corresponding ones of each of the one or more second dispense heads.

2. The method of claim 1, further comprising acquiring an image of the alignment test pattern, wherein the offset distances between the first droplets and the second droplets are determined using the image.

3. The method of claim 2, wherein the image is acquired using an image sensor coupled to the dispense head assembly.

4. The method of claim 1, further comprising using the timing offsets to control dispensing of droplets from one or more of the plurality of dispense heads in an additive manufacturing process.

5. The method of claim 1, wherein forming the alignment test pattern comprises dispensing the first and second droplets onto the test substrate while moving the dispense head assembly and the test substrate relative to one another along a first axis.

6. The method of claim 5, wherein each of the one or more columns are orthogonal to the first axis.

7. The method of claim 6, wherein the offset distances are measured along the first axis between parallel lines disposed through centroids of the first and second droplets within each of the one or more columns.

8. The method of claim 5, wherein the first droplets comprise a pre-polymer composition.

9. The method of claim 8, wherein forming the alignment test pattern comprises exposing each of the first droplets to UV radiation within 1 second or less of the first droplets contacting a surface of the test substrate.

10. A method for aligning a plurality of dispense heads of an additive manufacturing system, the method comprising:
    forming an alignment test pattern comprising a plurality of spaced-apart droplets arranged in a grid comprising one or more columns, wherein each of the one or more columns comprises first droplets dispensed from a first dispense head and second droplets dispensed from a corresponding one of one or more second dispense heads;
    comparing, within each of the one or more columns, a placement of the second droplets to a placement of the first droplets to determine respective offset distances therebetween; and
    generating, using the offset distances determined within each of the one or more columns, one or more timing offsets to be used for corresponding ones of each of the one or more second dispense heads.

11. The method of claim 10, wherein the first droplets comprise a pre-polymer composition.

12. The method of claim 11, further comprising using the timing offsets to control dispensing of droplets from one or more of the plurality of dispense heads in an additive manufacturing process.

* * * * *